(12) United States Patent
Fujihara et al.

(10) Patent No.: US 7,774,778 B2
(45) Date of Patent: Aug. 10, 2010

(54) DEVICE CONTROL APPARATUS, DEVICE CONTROL METHOD, AND COMPUTER-READABLE RECORDING MEDIUM RECORDED WITH DEVICE CONTROL PROGRAM

(75) Inventors: Yutaka Fujihara, Hirakata (JP); Shusuke Haruna, Itami (JP); Hirokazu Yamamoto, Osaka (JP); Takeshi Makiyori, Kyoto (JP); Sumio Kurose, Takatsuki (JP); Takuya Nomura, Osaka (JP); Yasushi Tamakoshi, Hirakata (JP)

(73) Assignee: Panasonic Corporation, Osaka (JP)

( * ) Notice: Subject to any disclaimer, the term of this patent is extended or adjusted under 35 U.S.C. 154(b) by 1409 days.

(21) Appl. No.: 11/058,219

(22) Filed: Feb. 16, 2005

(65) Prior Publication Data

US 2005/0188375 A1 Aug. 25, 2005

(30) Foreign Application Priority Data

Feb. 25, 2004 (JP) .............................. 2004-049647

(51) Int. Cl.
*G06F 9/46* (2006.01)
(52) U.S. Cl. ........................... 718/100; 700/11; 386/46; 348/150; 348/734
(58) Field of Classification Search ................ 718/100; 700/11; 386/46; 348/150, 734
See application file for complete search history.

(56) References Cited

U.S. PATENT DOCUMENTS

| | | | | |
|---|---|---|---|---|
| 6,289,252 B1 * | 9/2001 | Wilson et al. | ................... | 700/7 |
| 6,317,152 B1 * | 11/2001 | Hobson et al. | .............. | 348/150 |
| 6,442,328 B1 * | 8/2002 | Elliott et al. | .................. | 386/46 |
| 6,650,824 B1 * | 11/2003 | Horlander et al. | ............. | 386/46 |
| 2001/0033343 A1 * | 10/2001 | Yap et al. | .................... | 348/734 |

FOREIGN PATENT DOCUMENTS

JP 11-338684 12/1999

* cited by examiner

*Primary Examiner*—Albert DeCady
*Assistant Examiner*—Tejal J Gami
(74) *Attorney, Agent, or Firm*—Wenderoth, Lind & Ponack, L.L.P.

(57) ABSTRACT

A device control apparatus has a state processing task section 101 for determining an operation state of a device among a plurality of operation states of the device; a sequence processing task section 107 for running a processing program among a plurality of processing programs, and a task connecting section 111 for selecting the sequence processing program corresponding to the operation state of the device determined by the state processing task section to activate the sequence processing task section 107. In this arrangement, the sequence processing program can be easily written without considering an internal state transition processing, and the internal state transition processing and the sequence processing program can be freely designed without the need of modifying the sequence processing program due to change of the internal state transition processing.

7 Claims, 14 Drawing Sheets

FIG.9

```
typedef struct payload_t {
    int         seq;          /* sequence processing task ID */
    int         exception;    /* sequence exception ID */
    int         signal;       /* kind of sequence exception */
    struct payload_t *next;   /* next pointer */
    int         param1;       /* parameter 1 */
    int         param2;       /* parameter 2 */
    int         param3;       /* parameter 3 */
    int         param4;       /* parameter 4 */
    void        *ptr;         /* parameter for pointer */
} EXCEPTION;
```
— 911

```
typedef struct command_t {
    int         to;           /* recipient ID */
    int         from;         /* sender ID */
    struct command_t *next;   /* next pointer */
    int         slot;         /* slot ID */
    int         job;          /* job ID */
    int         event;        /* action ID */
    struct payload_t *payload; /* pointer to sequence exception command */
} COMMAND;
```
— 912

```
typedef struct seqinfo_t {
    UI_16       no;           /* sequence No. */
    UI_16       signal;       /* kind of sequence exception (0 represents normal sequence) */
    UI_32       param1;       /* argument 1 */
    UI_32       param2;       /* argument 2 */
    UI_32       param3;       /* argument 3 */
    UI_32       param4;       /* argument 4 */
} SEQINFO;
```
— 913

```
typedef struct seq_msg_t {
    UI_16       to;
    UI_16       from;
    UI_16       slot;
    UI_16       job;
    UI_16       media;        /* logic media No. */
    SEQINFO     seq;          /* sequence information */
    struct seq_msg_t *next;   /* pointer to next message */
} SEQ_MSG;
```
— 914

```
typedef struct rsq_seq_t {
    void (*sequence)(SEQ_MSG seq_msg);              /* function pointer to sequence body */
    void (*exception)(COMMAND *msg, EXCEPTION *exc); /* function pointer to exception processing */
} SEQ_DAT;
```
— 915

FIG.10

```
SEQ_DAT seq_array[SEQ_MAX] = {
        {Play, PlayStart},  /* playback sequence, sequence exception */
                :
                :
};
```
⎯921

FIG.11

```
void SEQ_Main(int media)
{
        SEQ_MSG *msg;   /* variable for storing message */ for (;;) {
                /* receive message */
                RcvDtq(SEQ, &msg);

/* execute sequence */
                seq_array[msg->job].sequence(msg);
        }
}
```
⎯931

FIG.12

```
void EXC_Main(void)
{
        COMMAND       *msg, *tmp_msg;  /* message for receiving */
        EXCEPTION     *exc, *tmp_exc;  /* message for sequence exception processing */
        for (;;) {
                /* receive message */
                RcvDtq(&msg);

/* loop while command exists */
                while(msg != NULL){
                        /* copy sequence exception command pointer */
                        exc = msg->payload;

/* loop while sequence exception command exists */
                        while (exc != NULL) {
                                /* call sequence exception processing function */
                                seq_array[exc->exception].exception(msg, exc);
                                /* set next sequence exception command */
                                exc = exc->next;
                        }
                        /* set next command */
                        msg = (COMMAND *)(msg->next);
                }
        }
}
```

FIG.13

```
void Play_Start(COMMAND *msg, EXCEPTION *exc)         951
{
        SEQ_MSG *seq_msg;
        ER      ercd = E_OK;

seq_msg = MakeExcPacket(msg, exc);
        StaTsk(exc->seq, 0);   /* wake up sequence processing task */ ercd = PSndDtq(SEQ, seq_msg);
}
```

FIG.14

```
void Play(RSQ_MSG_T rsq_msg)        961
{
        /* playback processing */
}
```

DEVICE CONTROL APPARATUS, DEVICE CONTROL METHOD, AND COMPUTER-READABLE RECORDING MEDIUM RECORDED WITH DEVICE CONTROL PROGRAM

BACKGROUND OF THE INVENTION

1. Field of the Invention

The present invention relates to a device control apparatus for varying the contents of sequence processing depending on a state of a device, a device control method, and a computer-readable recording medium recorded with a device control program.

2. Description of the Related Art

There is known a conventional method for device-embedded real time processing software architecture as disclosed, for example, in Japanese Unexamined Patent Publication No. 11-338684. FIG. 15 is an illustration showing the method of a conventional state transition operating system architecture recited in the publication. The state transition operating system shown in FIG. 15 comprises sequence components (internal state components) 301, and a connecting component (event input component) 302 for connecting the internal state components 301. Each of the internal state components 301 stores therein a sequence control program. When transition of the internal state of the device occurs, the sequence control program in the internal state component 301 is activated. In response to input of an event through external manipulation, the event input component 302 distributes the event to the internal state component 301 to thereby cause transition of the internal state of the device.

Generally, the conventional device-embedded control software, including the above example, constantly performs a predetermined cyclic processing to carry out overall control of the device while changing the state of the device by outputting a control signal based on a required timing, acquiring a signal indicative of a user's manipulation, or performing other necessary processing.

In the following, an architecture of the conventional device-embedded control software is described referring to FIG. 16. The control software shown in FIG. 16 has a loop architecture 211 for constantly executing a predetermined cyclic processing, wherein control signal output processing S201, S210, and a like step are executed for controlling a target object to be controlled (namely, a device). In addition to the control signal output processing, the loop architecture 211 has an internal state transition processing S202 and a like step to administer the current state of the device to be controlled. In addition to the control signal output processing and the internal state transition processing, the loop architecture 211 has a user input acquisition processing S203 and a like step for accepting input indicative of a user's manipulation. The user input acquisition processing is executed depending on the kind of the input. For example, there is a case that a control signal output processing S205 is executed, which is not executed normally, based on a judgment result of an input judgment processing S204. Further, there is a case that an internal state transition processing S208 is executed to make transition of the internal state, followed by a control signal output processing S209, which is not executed normally, depending on the kind of the input.

In the aforementioned control software, the internal state transition processing is not separated from the control signal output processing or a sequence control program for controlling the device. Therefore, in the case where it is necessary to alter the internal state transition processing due to change of the arrangement of the internal state, it is required to alter the signal output processing or the sequence control program as well, which makes it difficult to carry out software maintenance. Furthermore, since design of the internal state transition processing is constrained by the order of processing of the sequence control program, it is impossible for a designer to write the control program according to the designer's intension, thus obstructing free designing on the internal state of the device.

SUMMARY OF THE INVENTION

In view of the problems residing in the prior art, it is an object of the present invention to provide a device control apparatus, a device control method, and a computer-readable recording medium recorded with a device control program that enable a designer to facilitate writing a sequence processing program without considering an internal state transition processing, and to freely design the internal state transition processing or the sequence processing program without the need of modifying the sequence processing program due to change of the internal state transition processing.

An aspect of the invention is directed to a device control apparatus comprising: a state determining section which determines an operation state of a device among a plurality of operation states of the device; a first sequence processing section which runs a processing program among a plurality of processing programs, and an activating section which selects the processing program corresponding to the operation state of the device determined by the state determining section, and activates the first sequence processing section.

Another aspect of the invention is directed to a device control method comprising in the order of: a state determining step of determining an operation state of a device among a plurality of operation states of the device; a first selecting step of selecting a processing program corresponding to the operation state of the device determined in the state determining step, from among a plurality of processing programs; and a first activating step of activating a first sequence processing section to run the processing program selected in the first selecting step.

Yet another aspect of the invention is directed to a computer-readable recording medium recorded with a device control program that causes a computer to function as: state determining means for determining an operation state of a device among a plurality of operation states of the device; sequence processing means for running a processing program among a plurality of processing programs; and activating means for selecting the processing program corresponding to the operation state of the device determined by the state determining means, from among the plurality of processing programs, and activating the sequence processing means.

According to the above arrangements, by separating an internal state transition processing from the sequence processing program, the sequence processing program can be easily written without considering the internal state transition processing. Further, the internal state transition processing and the sequence processing program can be freely designed without the need of modifying the sequence processing program due to change of the internal state transition processing.

These and other objects, features and advantages of the present invention will become more apparent upon reading of the following detailed description along with the accompanying drawings.

BRIEF DESCRIPTION OF THE DRAWINGS

FIG. 9 is an illustration showing an example of a program code of data architecture.

FIG. 10 is an illustration showing an example of a program code of sequence data.

FIG. 11 is an illustration showing an example of a program code of a sequence processing task section.

FIG. 12 is an illustration showing an example of a program code of the task connecting section.

FIG. 13 is an illustration showing an example of a program code of a sequence exception processing function in the task connecting section.

FIG. 14 is an illustration showing an example of a program code of a sequence processing function.

DETAILED DESCRIPTION OF THE PREFERRED EMBODIMENTS

In the following, preferred embodiments of the present invention are described referring to the accompanying drawings.

First Embodiment

Figure 1:
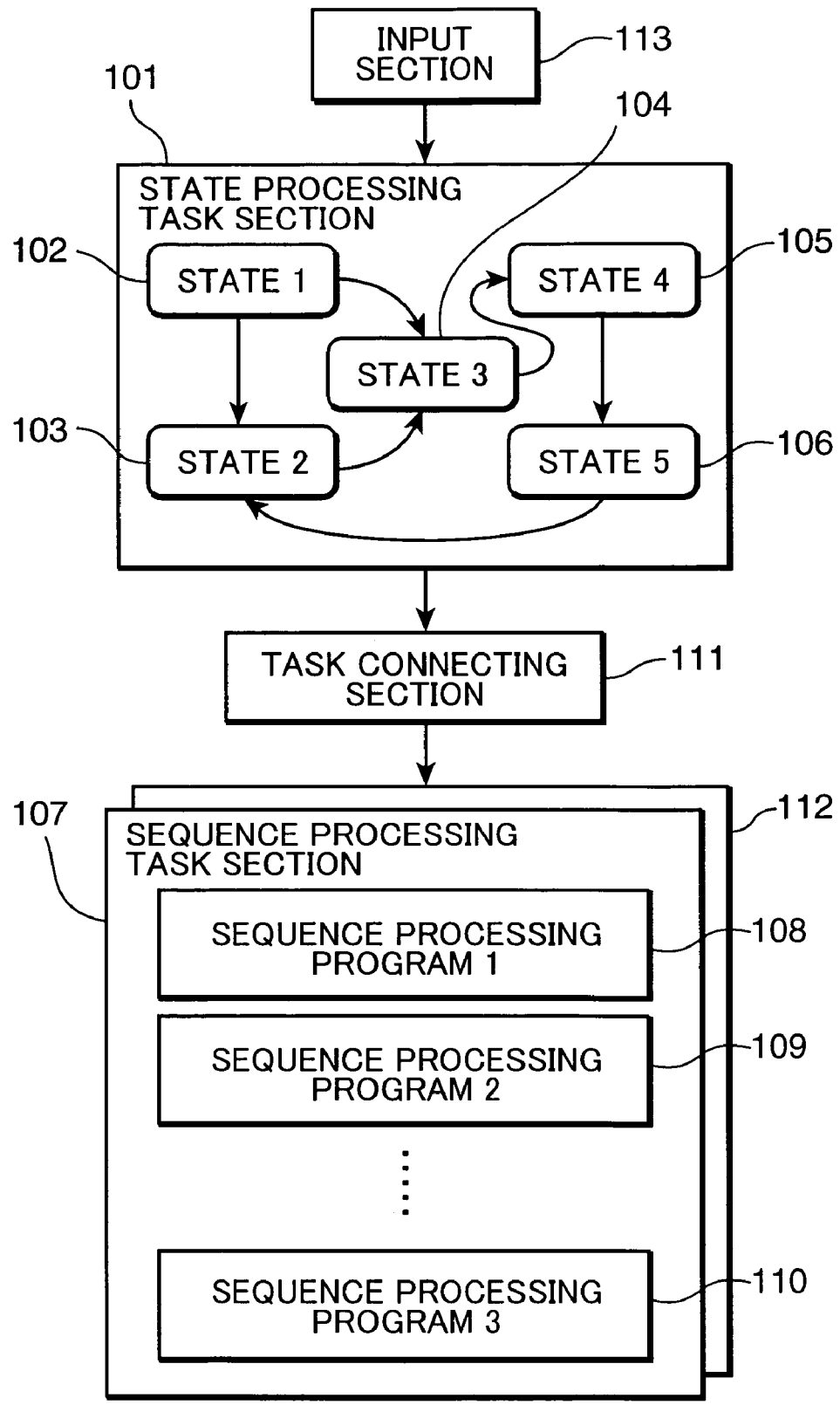
FIG. 1 is an illustration showing a software architecture of a device control apparatus for real time processing as a first embodiment of the present invention.

FIG. 1 is an illustration showing a software architecture of a device control apparatus for real time processing, as a first embodiment of the present invention.

Referring to FIG. 1, a state processing task section 101 performs a processing (state transition processing), as an independent processing unit, concurrently with another task, by utilizing a task function of a real time operating system (OS). The state processing task section 101 holds states 102, 103, 104, 105, 106 concerning a device to be controlled so as to implement the state transition processing, wherein the state of the device is changed from one to the other among the states 102, 103, 104, 105, 106. An input section 113 is adapted to accept input of a user's manipulation. For instance, the input section 113 designates transition from the state 102 to the state 103 or to the state 104. The state processing task section 101 executes the state transition processing based on designation contents inputted through the input section 113. Each of the states 102, 103, 104, 105 holds information on a sequence processing program that is to be executed when the device is in the relevant state.

A sequence processing task section 107 is a task for running sequence processing programs 108, 109, 110. Similarly to the state processing task section 101, the sequence processing task section 107 performs a processing, as an independent processing unit, concurrently with another task, by utilizing the task function of the real time OS. The sequence processing task section 107 can run an arbitrary sequence processing program. In the case where it is necessary to execute plural sequence processing programs concurrently, a sequence processing task section 112 is activated as well the sequence processing task section 107 to run the plural sequence processing programs. Thus, the sequence processing task sections 107 and 112 are executed concurrently by utilizing the task function of the real time OS, as in the case of another task.

A task connecting section 111 is a module for connecting the state processing task section 101 to the sequence processing task section 107. The task connecting section 111 is periodically activated by timer interrupt. The timer interrupt period is set to a sufficient time necessary for processing a message sent from the state processing task section 101. The task connecting section 111 receives the message from the state processing task section 101 by polling, each time the task connecting section 111 is activated by the timer interrupt. The task connecting section 111 processes the message sent from the state processing task section 101 exclusively based on the timer interrupt period.

Figure 2:
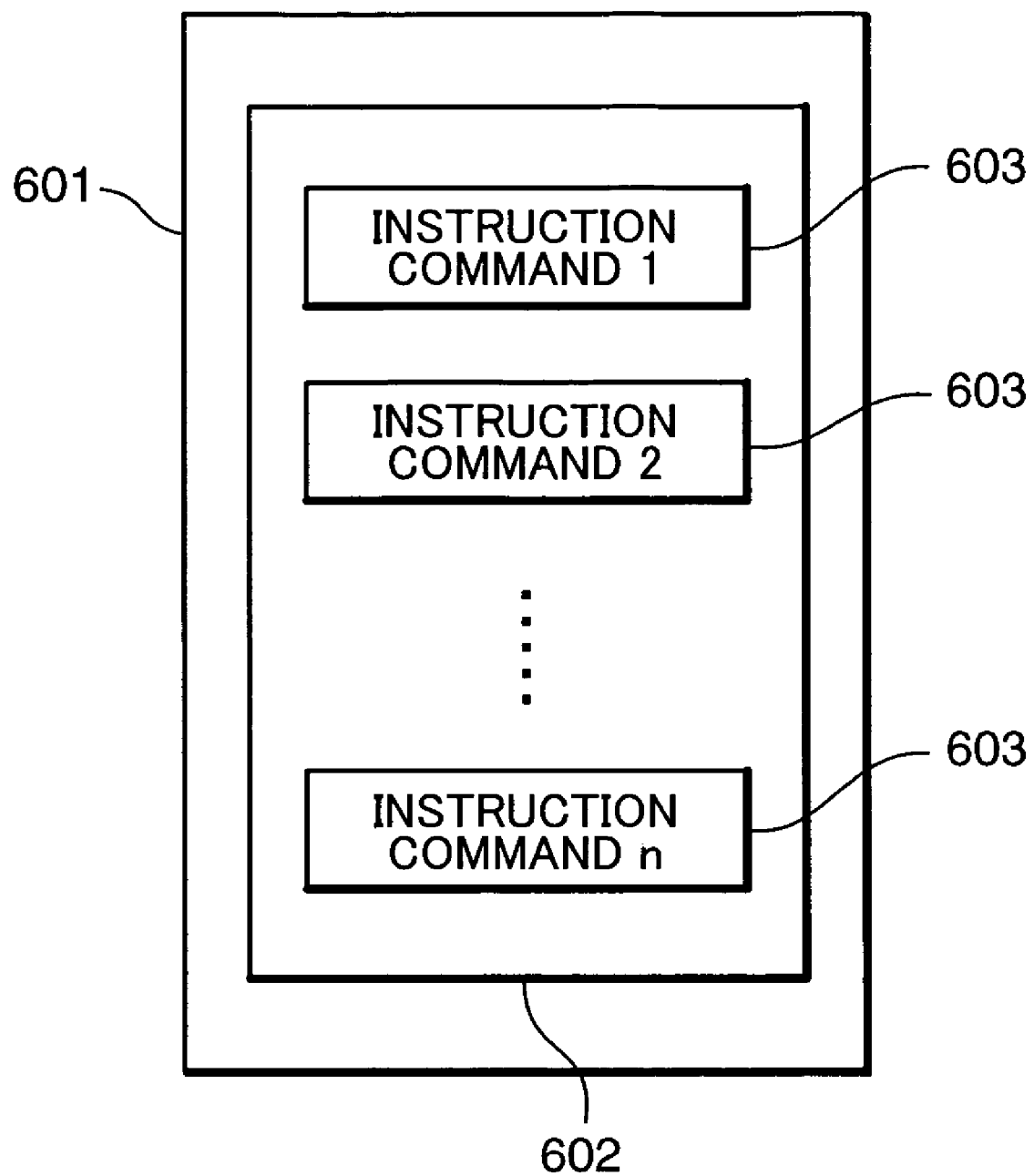
FIG. 2 is an illustration showing how a message is outputted from a state processing task section.

The message from the state processing task section 101 is sent to the task connecting section 111 in a state that the contents of plural instruction commands are packetized, and the packet is stored in the message. FIG. 2 shows how the message is sent from the state processing task section 101 to the task connecting section 111. An inter-task message 601 shown in FIG. 2 is a message which is communicated between the state processing task section 101 and the task connecting section 111 with use of a communicating function of the real time OS, and is sent from the state processing task section 101 to the task connecting section 111. An instruction command packet 602 is stored in the inter-task message 601.

The instruction command packet 602 is a group of instruction commands, wherein a certain number of instruction commands 603, 603, . . . each adapted to be sent from the state processing task section 101 to the sequence processing task section 107 are packetized. After the instruction command packet 602 is interpreted by the task connecting section 111, and deconstructed into individual instruction commands 603, each of the instruction commands 603 is sent to the sequence processing task section 107. The instruction commands 603 include a command for designating the kind of activation sequence, a sequence parameter command, and a command for sequence exception processing.

Now, the command for designating the kind of activation sequence, the sequence parameter command, and the sequence exception processing command are described by taking an example of a video recorder. The command for designating the kind of activation sequence is a command for designating playback from an optical disk, recording to the optical disk, or a like operation. The sequence command parameter is a command for designating parameters such as a playback speed, and a recording bit rate. The sequence exception processing command is a command to be issued, for instance, when the playback speed is altered during playback, or when playback is stopped during playback. Specifically, if the playback speed is changeable, the parameter (playback speed) is altered in response to user's depressing a fast-forward button during playback. Also, in response to user's depressing a stop button during playback, the on-going playback processing sequence is stopped, and a stop processing sequence is activated after a buffer flush.

The command for designating the kind of activation sequence, and the sequence parameter command are sent to the sequence processing task section 107, as an instruction command for sequence processing. The sequence exception processing command is a command for activating an auxiliary sequence processing to execute a post-process, an initialization process, or a like process for sequence alteration, in the case where the processing is changed from a sequence to another sequence. After the sequence exception processing command is interpreted in the task connecting section 111, a processing requested by the instruction command is implemented by calling a sequence exception processing.

Figure 3:
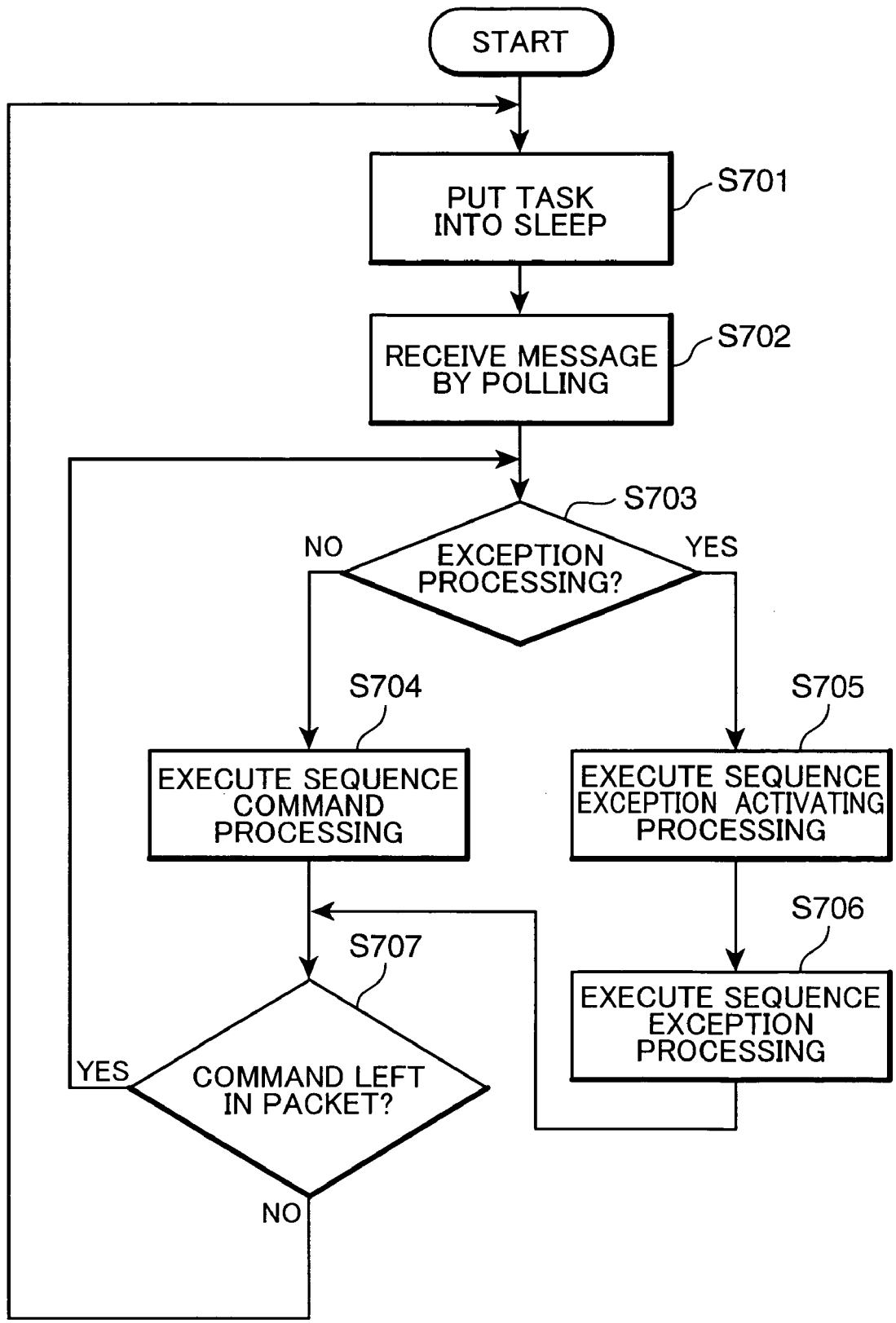
FIG. 3 is a flowchart for explaining the contents of a processing of a task connecting section.

The task connecting section 111 processes all the instruction commands received as the instruction command packet 602 by one-time activation. The contents as to how the task connecting section 111 performs the processing are described referring to FIG. 3. FIG. 3 is a flowchart for explaining the contents of the processing to be implemented by the task connecting section 111.

Referring to FIG. 3, the task connecting section 111 puts its own task into sleep, and waits until it receives a message from the state processing task section 101 (Step S701). When the task connecting section 111 receives the message from the state processing task section 101, the task connection section 111 wakes up to become an execution state. When the task connecting section 111 becomes the execution state, the task connecting section 111 acquires the message sent thereto by polling (Step S702).

Upon receiving the message, the task connecting section 111 determines the kind of an initial instruction command included in the packet of the received message (Step S703). If the received instruction command is other than a sequence exception processing command (NO in Step S703), the task connecting section 111 activates the sequence processing task section 107 by issuing a sequence activation command or implementing a sequence parameter notification processing based on the contents of the instruction command (Step S704).

On the other hand, if the received instruction command is the sequence exception processing command (YES in Step S703), the task connecting section 111 executes a sequence exception activating processing (Step S705). Thereafter, the task connecting section 111 executes a sequence exception processing by calling the actual sequence exception processing based on the kind of the sequence exception processing designated by the instruction command (Step S706). The sequence exception processing will be described later referring to FIG. 4.

If the processing of the instruction command in Step S704 or Step S706 is completed, then, the task connecting section 111 judges whether there remains an instruction command in the packet of the received message (Step S707). If it is judged that there remains an unprocessed instruction command (YES in Step S707), the routine returns to Step S703 to cyclically repeat the aforementioned processing. If the processing of all the instruction commands have been completed, and it is judged that there remains no instruction command in the packet (NO in Step S707), the routine returns to Step S701, wherein the task connecting section 111 puts its own task into sleep, and waits until it receives a message from the state processing task section 101.

In this way, the internal state transition processing, which is implemented in response to change of the state of the device, is executed by the state processing task section 101, and a sequence processing is executed by the sequence processing task section 107, independently of the internal state transition processing.

Figure 4:
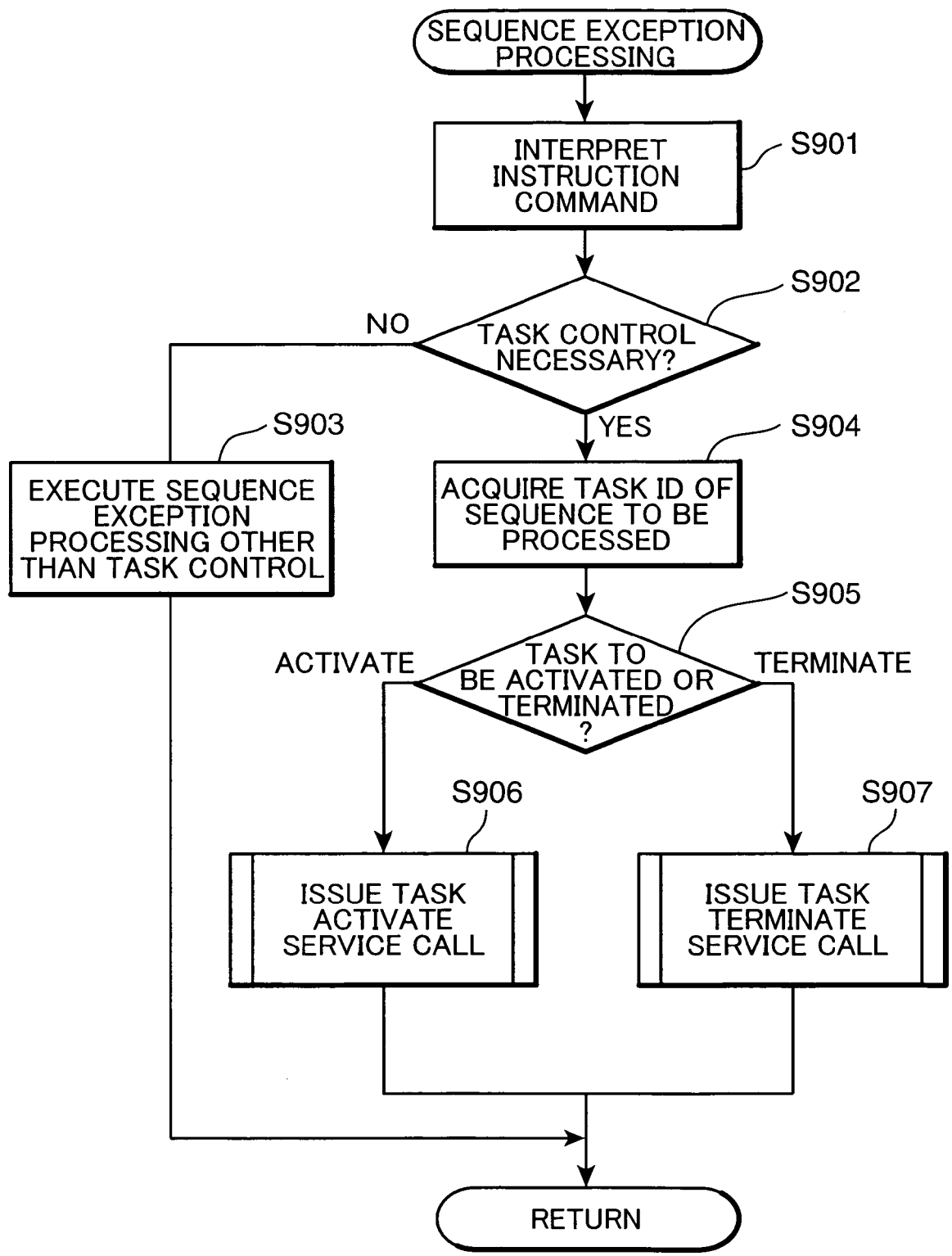
FIG. 4 is a flowchart for explaining a sequence exception processing in the first embodiment of the present invention.

Next, the sequence exception processing in Step S706 of FIG. 3 is described. In the sequence exception processing in this embodiment, activation and termination of a task are switched over. FIG. 4 is a flowchart for explaining the sequence exception processing in this embodiment.

First, in Step S901, the task connecting section 111 interprets the instruction command. Then, in Step S902, the task connecting section 111 judges whether task control is necessary based on an interpretation result of the inputted instruction command. If it is judged that task control is required (YES in Step S902), the routine proceeds to Step S904, whereas if it is judged that task control is not required (NO in Step S902), the routine proceeds to Step S903.

If task control is not required (NO in Step S902), the task connecting section 111 executes a sequence exception processing other than task control (Step S903). On the other hand, if task control is required (YES in Step S902), the task connecting section 111 acquires the task ID of the sequence to be processed. The task ID is adapted to designate the ID number of the task to be processed.

Next, in Step S905, the task connecting section 111 judges whether the task is to be activated or terminated, based on the acquired task ID. If it is judged that the task is to be activated (ACTIVATE in Step S905), the routine proceeds to Step S906, whereas if it is judged that the task is to be terminated (TERMINATE in Step S905), the routine goes to Step S907.

If it is judged that the task is to be activated, the task connecting section 111 issues a task activate service call to activate the task (Step S906). On the other hand, if it is judged that the task is to be terminated, the task connecting section 111 issues a task terminate service call to terminate the task (Step S907).

In this way, the task connecting section 111 as an example of the activating section selects an exception processing program of activating or terminating the task function of the operating system, and activates the sequence processing task section 107. This arrangement enables to easily activate and terminate the task function of the operating system.

As mentioned above, the task connecting section 111 activates the sequence processing task section 107 upon receiving the command of activating the sequence processing program, and notifies the sequence processing task section 107 of the kind of the sequence processing program to which activation has been instructed from the state processing task section 101. Then, the sequence processing task section 107 activates the designated sequence processing program. In this way, after the sequence processing task section 107 activates the sequence processing program upon receiving the notification from the task connecting section 111, the sequence processing task section 107 executes merely the processing written in the sequence processing program, independently of the processing of the state processing task section 101 until a new notification is issued from the task connecting section 111.

Figure 5:
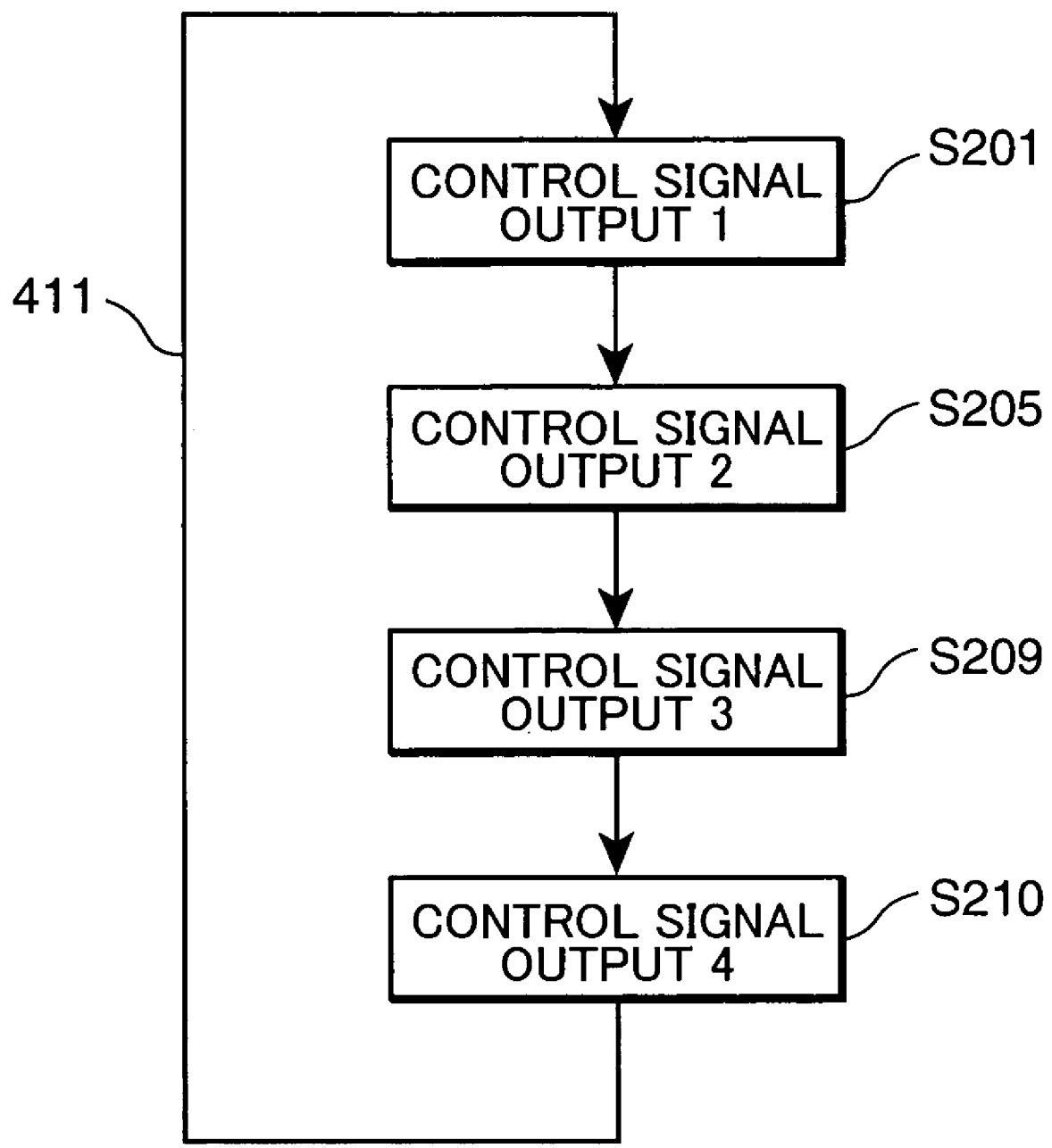
FIG. 5 is a flow diagram showing the contents of a sequence processing to be written in a sequence processing program.
Figure 16:
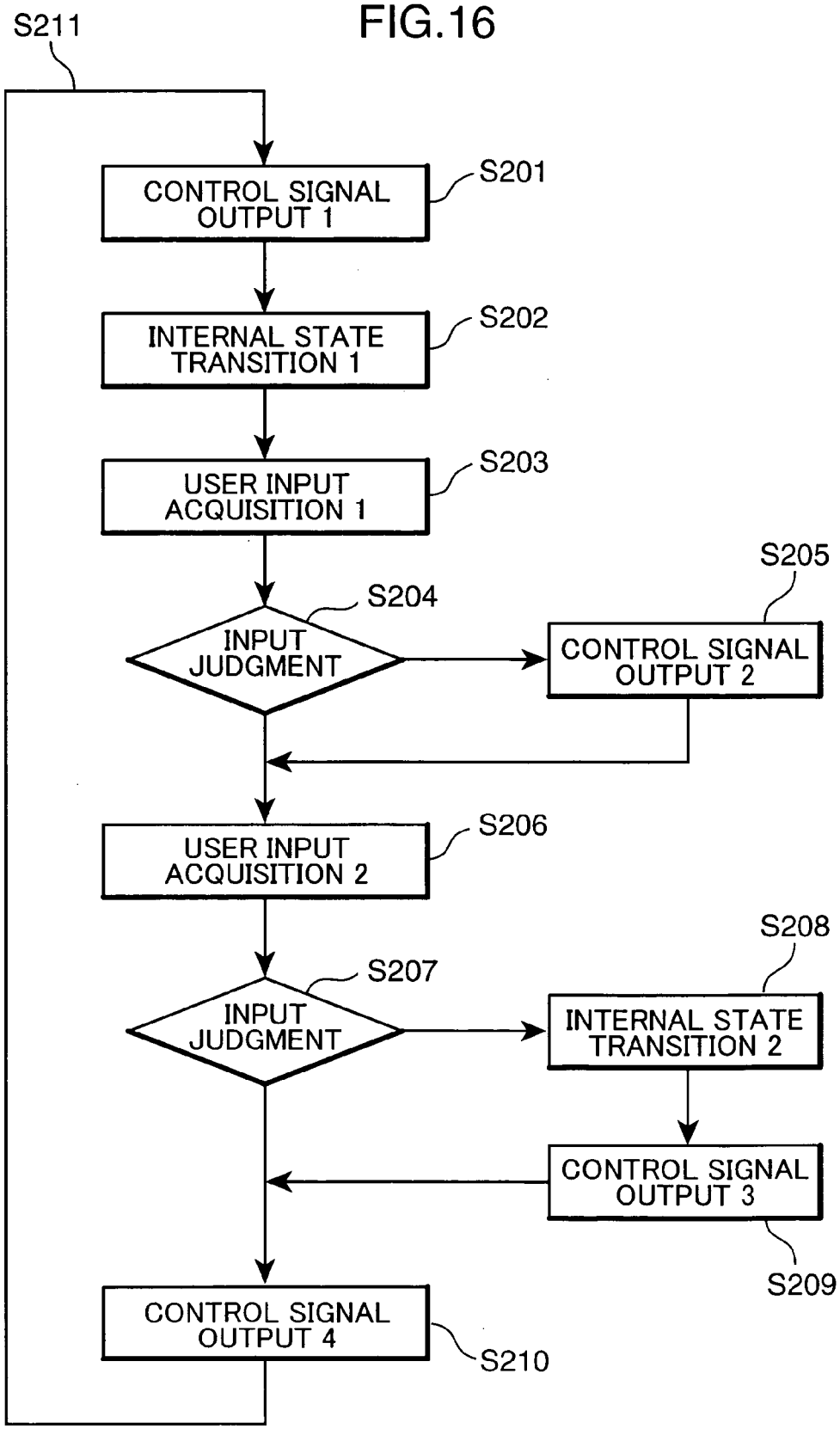
FIG. 16 is a flowchart showing the contents of a sequence processing of the convention real time processing software.

FIG. 5 is a flow diagram showing an example of the contents of a sequence processing to be written in the sequence processing program. As shown in FIG. 5, merely the contents concerning the sequence processing are written in the sequence processing program, without writing a state transition processing of the device. Specifically, in the sequence processing according to the embodiment of the present invention, the internal state transition processing S202, S208, and the input judgment processing S204, S207 shown in FIG. 16 are not necessary. A loop architecture 411 of the sequence processing in FIG. 5 is configured such that control signal output processing S201, S205, S209, S210 are successively executed in accordance with an algorithm of the program to implement a cyclic processing. Steps in FIG. 5 which are equivalent to those in FIG. 16 are denoted by the same reference numerals, and description thereof are omitted.

In the configuration shown in FIG. 5, it is possible to write the sequence processing program independently of the internal state transition processing by writing the internal state transition processing in the state processing task section 101, and writing the sequence processing program in the sequence processing task section 107.

As mentioned above, the sequence processing task section 107 as an example of the first sequence processing section runs a processing program among the plural sequence processing programs. Further, the state processing task section 101 as an example of the state determining section determines an operation state of the device among the plural operation states, and the task connecting section 111 as an example of the activating section activates the sequence processing task section 107 by selecting the processing program corresponding to the operation state of the device determined by the state processing task section 101.

Thus, by separating the internal state transition processing from the sequence processing program, the sequence processing program can be easily written without considering the internal state transition processing. Further, it is possible to freely design the internal state transition processing and the sequence processing program without the need of modifying the sequence processing program due to change of the internal state transition processing. In addition, since the sequence processing program can be altered independently of the internal state of the device, update of the sequence processing program is easy.

In the case where the state processing task section 101 determines that the device is in an operation state other than the current operation state, the sequence exception processing program for altering the sequence processing program is selected, and the sequence processing task section 107 is activated by the task connecting section 111. In this way, by selecting the sequence exception processing program for altering the sequence processing program and by activating the sequence processing task section 107, switching of the sequence processing programs can be smoothly performed.

Second Embodiment

Figure 6:
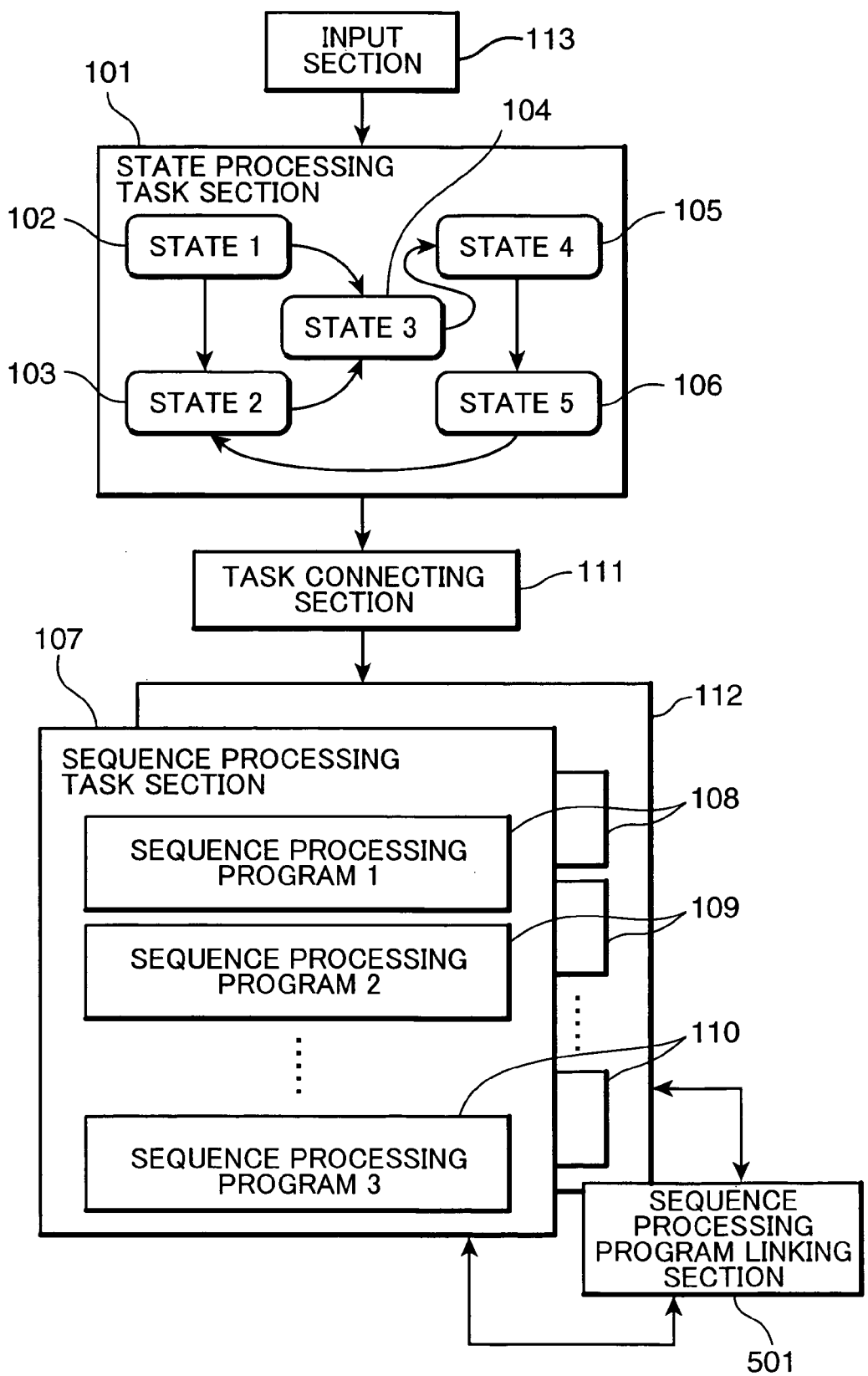
FIG. 6 is an illustration showing a software architecture of a device control apparatus for real time processing as a second embodiment of the present invention.

FIG. 6 is an illustration showing a software architecture of a device control apparatus for real time processing as a second embodiment of the present invention. Elements in FIG. 6 which are equivalent to those in FIG. 1 are denoted by the same reference numerals, and description thereof will be omitted herein.

Referring to FIG. 6, a sequence processing program linking section 501 provides a mechanism for linking a sequence processing task section 107 and a sequence processing task section 112. In the first embodiment, the sequence processing task section 107 and the sequence processing section 112 run independently of each other, and these sections 107 and 112 have no interrelation to each other in sequence processing. In the second embodiment, the sequence processing task section 107 and the sequence processing task section 112 run in association and in cooperation with each other. The sequence processing program linking section 501 communicates data necessary for linking the task sections 107 and 112 by utilizing a shared memory mechanism provided by a real time OS, for instance.

In the above arrangement, sequence processing programs that are to be run concurrently and have interrelation to each other on operation can be run concurrently in cooperation with each other in the sequence processing task section 107 and in the sequence processing task section 112.

Thus, the sequence processing task section 112 as an example of the second sequence processing section runs a processing program among the plural sequence processing programs, other than the processing program to be run by the sequence processing task section 107. A task connecting section 111 selects the processing program corresponding to the operation state of the device determined by a state processing task section 101, and the sequence processing task section 112 is activated while the sequence processing task section 107 runs. In this way, the sequence processing programs having interrelation to each other on operation can be concurrently run in cooperation with each other in the sequence processing task section 107 and in the sequence processing task section 112.

Further, the sequence processing program linking section 501 as an example of the sequence processing linking section links the sequence processing task section 107 and the sequence processing task section 112 by data sending/receiving. This arrangement enables to run the plural sequence processing programs smoothly in cooperation with each other.

Furthermore, the data sending/receiving is carried out by causing each of the sequence processing task section 107 and the sequence processing task section 112 to write the data into a shared memory region. Accordingly, the data communication between the plural sequence processing task sections can be performed smoothly.

In the second embodiment, the two tasks exclusively used for processing a sequence processing program are provided, and the sequence processing program linking section is provided to link these two tasks to each other. Alternatively, three or more tasks for processing a sequence processing program may be provided to allow these tasks to implement respective processing in association and in cooperation with each other. Further alternatively, the sequence processing program linking section 501 may be arranged in such a manner as to link all the tasks for processing a sequence processing program which are required to be run in association and in cooperation with each other.

Third Embodiment

Figure 7:
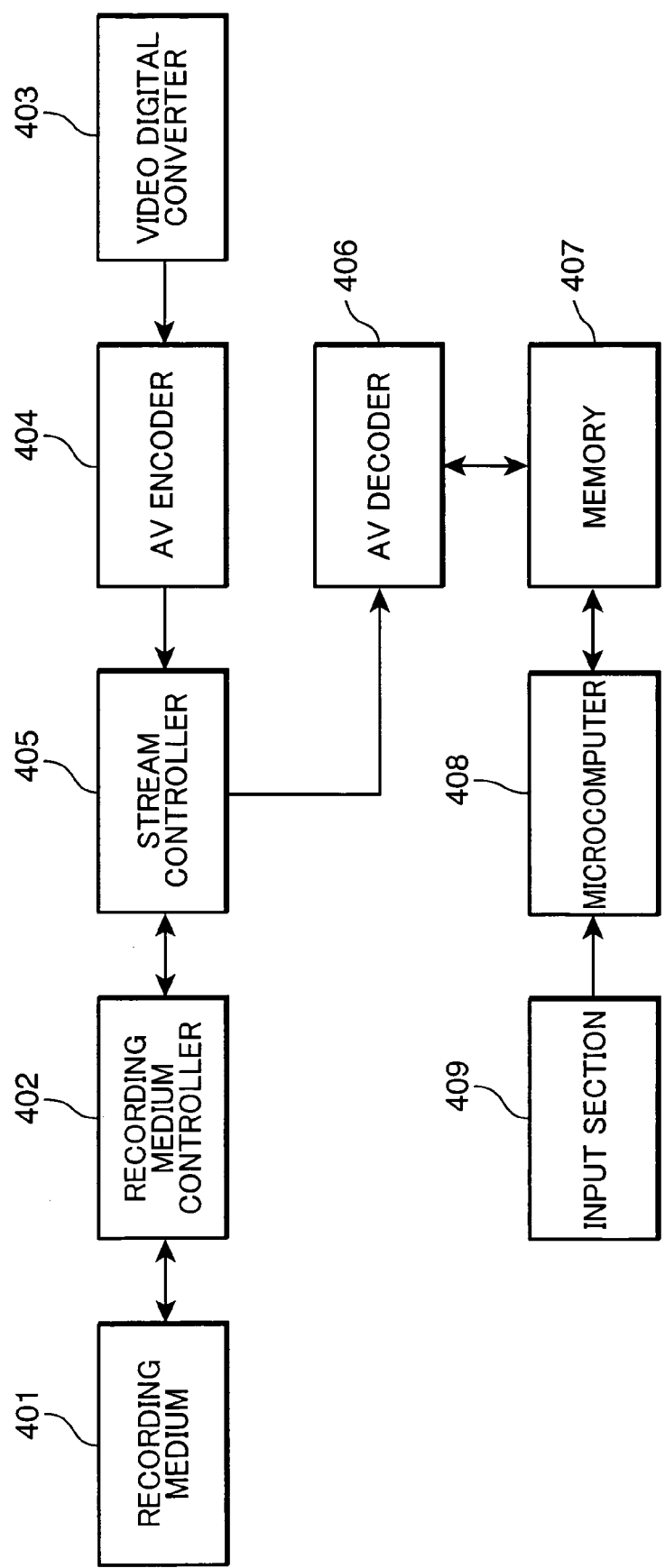
FIG. 7 is an illustration showing an example of a hardware architecture of a video recorder to which the device control apparatus of the present invention is applied.

FIG. 7 is an illustration showing an example of a hardware architecture of a video recorder to which the inventive device control apparatus is applied. The video recorder shown in FIG. 7 includes a recording medium 401, a recording medium controller 402, a video digital converter 403, an AV encoder 404, a stream controller 405, an AV decoder 406, a memory 407, a microcomputer 408, and an input section 409.

The recording medium 401 is a computer-readable recording medium, and examples thereof include optical disks for recording, such as DVD-R, DVD-RAM, and CD-R, optical disks for playback such as DVD-ROM, and CD-ROM, and video tapes such as VHS.

An example of the recording medium controller 402 is a DVD drive, through which data is written into or read out from the recording medium 401. The video digital converter 403 converts a received analog video signal into a digital video signal.

The AV encoder 404 encodes the digital video data that has been digitally converted by the video digital converter 403. The stream controller 405 streams the data that has been read out from the recording medium 401, or the data to be written into the recording medium 401.

The AV decoder 406 decodes the data that has been streamed in the stream controller 405. The memory 407 stores therein the data decoded by the AV decoder 406. The microcomputer 408 includes a central processing unit (CPU), a random access memory (RAM), and a read only memory (ROM) to control the overall operations of the device. The input section 409 accepts various instructions entered by a user, such as playback, recording, stopping, fast-forwarding, and time-shift playback.

Figure 8:
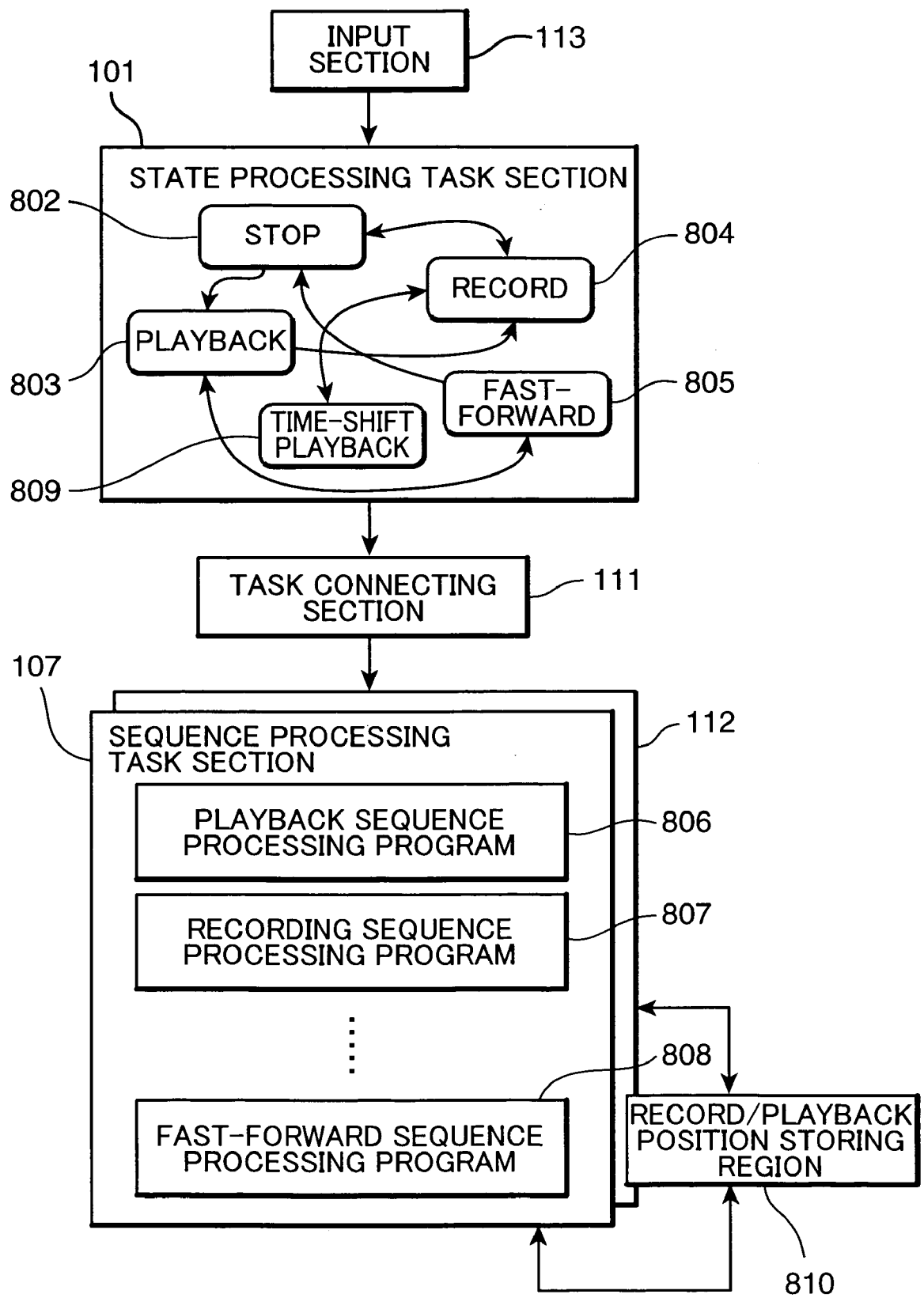
FIG. 8 is an illustration showing a software architecture of a device control apparatus for real time processing as a third embodiment of the present invention.
Figure 15:
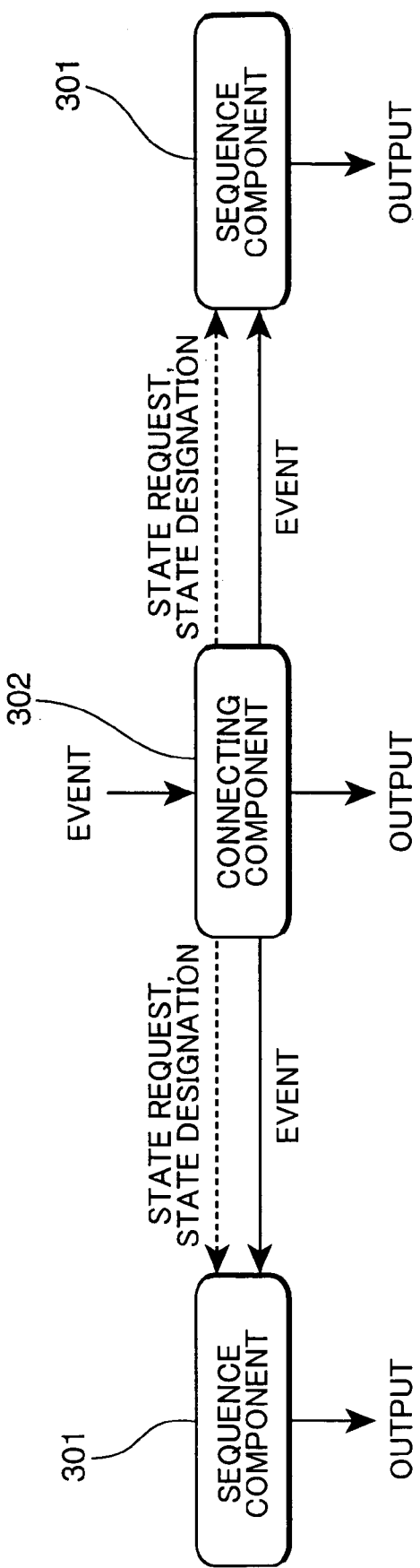
FIG. 15 is an illustration showing a method of a conventional state transition operating system architecture recited in the prior art document.

FIG. 8 is an illustration showing a software architecture of a device control apparatus for real time processing as a third embodiment of the present invention. The device control apparatus shown in FIG. 8 is realized by causing the microcomputer 408 shown in FIG. 7 to execute a device control program. Elements in FIG. 8 which are equivalent to those in FIG. 1 are denoted by the same reference numerals, and description thereof will be omitted herein.

The third embodiment shows an example, wherein the invention is applied to the video recorder. In FIG. 8, an internal state 802 represents a stop state where an operation of the video recorder is stopped, an internal state 803 represents a playback state where video is played back, an internal state 804 represents a recording state where the video recorder performs recording, and an internal state 805 represents a fast-forward state where the video recorder is fast-forwarded. A relation is defined, wherein transition is made in a predetermined order among these internal states. Namely, the transition of the internal state occurs solely in the directions of arrows shown in FIG. 8.

In the third embodiment, the following state transitions can be conducted: transition from the stop state 802 to the playback state 803 or to the recording state 804; transition from the playback state 803 to the recording state 804 or to the fast-forward state 805; transition from the fast-forward state 805 to the playback state 803 or to the stop state 802; and transition from the recording state 804 to the stop state 802.

If the video recorder makes a transition from the stop state 802 to the playback state 803 in response to designation of playback by a user's manipulation, a playback sequence processing program 806 corresponding to the playback state 803 is activated by way of a task connecting section 111. When the playback sequence processing program 806 is activated, the sequence processing task section 107 runs independently of a state processing task section 101 and concurrently therewith to execute exclusively a playback processing sequence. Next, if the video recorder makes a transition from the playback state 803 to the fast-forward state 805 in response to designation of fast-forwarding by a user's manipulation, a fast-forward sequence processing program 808 corresponding to the fast-forward state 805 is activated by way of the task connecting section 111. In this case, after the playback sequence processing 806 is stopped by the task connecting section 111, the fast-forward sequence processing program 808 is activated. Execution of the fast-forward sequence processing program 808 is initiated irrespective of the contents of the playback sequence processing program 806 that had been run immediately before the fast-forward sequence processing program 808 has been activated, or a condition under which the video recorder made a state transition. Likewise, a recording sequence processing program 807 or an equivalent program is activated independently of the state processing task section 101 when the video recorder makes a state transition in response to a user's manipulation.

If playback is designated by a user's manipulation while the recording sequence processing program 807 is run, the video recorder makes a state transition from the recording state 804 to a time-shift playback state 809 to execute time-shift playback. After the state of the video recorder is changed to the time-shift playback state 809, the on-going recording sequence processing program 807 keeps running, and a sequence processing task section 112 is newly added and activated by way of the task connecting section 111 to run the playback sequence processing program 806 concurrently with the recording sequence processing program 807. Data is exchanged between the recording sequence processing program 807 that had been running before the time-shift playback has been activated, and the newly activated playback sequence processing program 806 by way of a record/playback position storing region 810, so that these programs 807, 808 are run in association with each other. The recording sequence processing program 807 writes the current time of a program which is being recorded into the record/playback position storing region 810 as needed, and the playback sequence processing program 806 executes a playback processing by referring to the recorded time written in the record/playback position storing region 810. When the playback time catches up with the recorded time, a processing of terminating the playback processing is executed.

Next, the device control program as the third embodiment is described. FIGS. 9 through 14 are illustrations each showing an example of a program code of the device control program. The program codes shown in FIGS. 9 through 14 are written in C language. Alternatively, the program codes may be written in a program language other than C language. The device control program in this embodiment is pre-stored in a mask ROM. Alternatively, the device control program may be stored in a rewritable flash memory, or may be stored in a flash memory by way of a computer-readable recording medium, the Internet, a radio wave, or a like medium.

FIG. 9 is an illustration showing an example of a program code of data architecture. As shown in FIG. 9, the data architecture of the device control program comprises EXCEPTION data 911 concerning a sequence exception processing, COMMAND data 912 concerning an instruction command, SEQINFO data 913 concerning sequence information, SEQ_MSG data 914 concerning a message, and $SE_{13}QDAT$ data 915 concerning sequence data.

FIG. 10 is an illustration showing an example of a program code of sequence data. As shown in FIG. 10, the program code 921 represents sequence data. Plural sequence data such as playback sequence and sequence exception (Play, PlayStart) are prepared as the sequence data.

FIG. 11 is an illustration showing an example of a program code of the sequence processing task section. As shown in FIG. 11, the program code 931 represents the sequence processing task section 107, and the sequence processing task section 107 is realized by a function SEQ_Main (int media).

FIG. 12 is an illustration showing an example of a program code of the task connecting section. As shown in FIG. 12, the program code 941 represents the task connecting section 111, and the task connecting section 111 is realized by a function EXC_Main (void).

FIG. 13 is an illustration showing an example of a program code of a sequence exception processing function in the task connecting section. As shown in FIG. 13, the program code 951 represents a sequence exception processing in the task connecting section 111. The sequence exception processing in the task connecting section 111 is realized by a function Play_Start (COMMAND *msg, EXCEPTION *exc).

FIG. 14 is an illustration showing an example of a program code of a sequence processing function. As shown in FIG. 14, the program code 961 represents a sequence processing function. The sequence processing is realized by a function Play (RSQ_MSG_T rsq_msg).

In this embodiment, the record/playback position storing region 810, which is a shared data region for the sequence processing programs, is provided as an example of the sequence processing program linking section 501. Alternatively, it is possible to function the sequence processing program linking section 501 as a task to cause the sequence processing program linking section 501 to send shared information to each of the sequence processing programs. In this way, the record/playback position storing region 810 is activated as an independent task, and data sending/receiving is performed by distributing data for linking to each of the sequence processing task section 107 and the sequence processing task section 112. The data for linking is shared information that is to be used both in the sequence processing task section 107 and the sequence processing task section 112. This arrangement enables to smoothly perform data sending/receiving between the plural sequence processing task sections.

The present invention is useful as a software architecture method for a device which has predetermined operation states, wherein the sequence processing contents have to be changed depending on the operation state, specifically, as a device-embedded control software architecture method for a device such as a video tape recorder, a DVD player, or other consumer electronics. Thus, the industrial applicability of the present invention is wide and large.

To summarize the invention, according to an aspect of the invention, a device control apparatus comprises: a state determining section which determines an operation state of a device among a plurality of operation states of the device; a first sequence processing section which runs a processing program among a plurality of processing programs, and an activating section which selects the processing program corresponding to the operation state of the device determined by the state determining section, and activates the first sequence processing section.

In the above arrangement, the first sequence processing section runs a processing program among the plurality of processing programs. The state determining section determines a running state among the plurality of running states of the device. The activating section selects the processing program corresponding to the operation state of the device determined by the state determining section, and activates the first sequence processing section.

According to the above arrangement, by separating an internal state transition processing from the sequence processing program, the sequence processing program can be easily written without considering the internal state transition processing. Further, this arrangement enables to freely design the internal state transition processing and the sequence processing program without the need of modifying the sequence processing program due to change of the internal state transition processing.

Preferably, the device control apparatus may further comprise a second sequence processing section which runs a processing program other than the processing program to be run by the first sequence processing section among the plurality of processing programs, wherein the activating section selects the processing program corresponding to the operation state of the device determined by the state determining section, and activates the second sequence processing section while the first sequence processing section runs.

In the above arrangement, the second sequence processing section runs a processing program among the plurality of processing programs, other than the processing program to be run by the first sequence processing section. The activating section selects the processing program corresponding to the operation state of the device determined by the state determining section, and activates the second sequence processing section while the first sequence processing section runs. This arrangement makes it possible to concurrently run the sequence processing programs having interrelation to each other on operation in cooperation with each other in the first sequence processing section and in the second sequence processing section.

Preferably, the device control apparatus may further comprise a sequence processing linking section which links the first sequence processing section and the second sequence processing section by data sending/receiving.

In the above arrangement, since the sequence processing liking section links the first sequence processing section and the second sequence processing section by data sending/receiving, plural sequence processing programs can be smoothly run in cooperation with each other.

Preferably, the sequence processing linking section may include a shared memory region, and the data sending/receiving may be performed by causing the first sequence processing section and the second sequence processing section each to write the data into the shared memory region.

In the above arrangement, since data sending/receiving is performed by causing the first sequence processing section and the second sequence processing section each to write the data into the shared memory region, the data sending/receiving can be carried out smoothly in the plural sequence processing sections.

Preferably, the sequence processing linking section may be activated as an independent task to distribute the data for linking to each of the first sequence processing section and the second sequence processing section.

In the above arrangement, the sequence processing linking section is activated as an independent task, and data sending/receiving is performed by distributing the data for linking to each of the first sequence processing section and the second sequence processing section. The data for linking is information to be used both in the first sequence processing section and the second sequence processing section. This arrangement enables to smoothly carry out the data sending/receiving in the plural sequence processing sections.

Preferably, the activating section may select an exception processing program for altering the processing program, and activate the first sequence processing section if the state determining section determines that the device is in an operation state other than the current operation state.

In the above arrangement, the activating section selects the exception processing program for altering the processing program, and activates the first sequence processing section if the state determining section determines that the device is in an operation state other than the current operation state. Since the exception processing program for altering the processing program is selected, and the first sequence processing section is activated in the above-mentioned manner, switching of the processing programs can be performed smoothly.

Preferably, the activating section may select the exception processing program for activating or terminating a task of an operating system, and activate the first sequence processing section.

In the above arrangement, since the activating section selects the exception processing program for activating or terminating the task of the operating system, and activates the first sequence processing section, the task of the operating system can be easily activated or terminated.

According to another aspect of the invention, a device control method comprises in the order of: a state determining step of determining an operation state of a device among a plurality of operation states of the device; a first selecting step of selecting a processing program corresponding to the operation state of the device determined in the state determining step, from among a plurality of processing programs; and a first activating step of activating a first sequence processing section to run the processing program selected in the first selecting step.

In the above arrangement, the operation state of the device is determined among the plurality of operation states in the state determining step, the processing program corresponding to the operation state of the device determined in the state determining step is selected from among the plurality of processing programs in the first selecting step, and the first sequence processing section is activated to run the selected processing program in the first activating step.

Thus, by separating an internal state transition processing from the sequence processing program, the sequence processing program can be easily written without considering the internal state transition processing. Further, this arrangement enables to freely design the internal state transition processing and the sequence processing program without the need of modifying the sequence processing program due to change of the internal state transition processing.

Preferably, the device control method may further comprise: a second selecting step of selecting a processing program other than the processing program selected in the first selecting step; and a second activating step of activating a second sequence processing section to run the processing program selected in the second selecting step while the first sequence processing section runs.

In the above arrangement, the processing program other than the processing program selected in the first selecting step is selected in the second selecting step, and the second sequence processing section is activated to run the processing program selected in the second selecting step while the first sequence processing section runs in the second activating step. This arrangement enables to concurrently run the sequence processing programs having interrelation to each other on operation in cooperation with each other in the first sequence processing section and in the second sequence processing section.

Preferably, the device control method may further comprise a sequence processing linking step of linking the first sequence processing section and the second sequence processing section by data sending/receiving.

In the above arrangement, since the first sequence processing section and the second sequence processing section are linked to each other by the data sending/receiving in the sequence processing linking step, the plural sequence processing programs can be smoothly run in cooperation with each other.

Preferably, in the sequence processing linking step, the data sending/receiving may be performed by causing the first sequence processing section and the second sequence processing section each to write the data into a shared memory region.

In the above arrangement, since the data sending/receiving is performed by causing each of the first sequence processing section and the second sequence processing section to write the data into the shared memory region, the data sending/receiving in the plural sequence processing sections can be carried out smoothly.

Preferably, the sequence processing linking step may be activated as an independent task, and the data sending/receiving may be performed by distributing the data for linking to each of the first sequence processing section and the second sequence processing section.

In the above arrangement, the sequence processing linking step is activated as an independent task, and the data sending/receiving is performed by distributing the data for linking to each of the first sequence processing section and the second sequence processing section. The data for linking is information to be used both in the first sequence processing section and the second sequence processing section. This arrangement enables to smoothly carry out the data sending/receiving in the plural sequence processing sections.

It is preferable that an exception processing program for altering the processing program be selected, and the first sequence processing section be activated in the first activating step if it is determined that the device is in an operation state other than the current operation state in the state determining step.

In the above arrangement, if it is determined that the device is in the operation state other than the current operation state in the state determining step, the exception processing program for altering the processing program is selected, and the first sequence processing section is activated in the first activating step. Since the exception processing program for altering the processing program is selected, and the first sequence processing section is activated in this way, switching of the processing programs can be smoothly performed.

Preferably, in the first activating step, the exception processing program for activating or terminating a task of an operating system may be selected, and the first sequence processing section may be activated.

In the above arrangement, since the exception processing program for activating or terminating the task of the operating system is selected, and the first sequence processing section is activated in the first activating step, the task of the operating system can be easily activated or terminated.

According to yet another aspect of the invention, a computer-readable recording medium is recorded with a device control program that causes a computer to function as: state determining means for determining an operation state of a device among a plurality of operation states of the device; sequence processing means for running a processing program among a plurality of processing programs; and activating means for selecting the processing program corresponding to the operation state of the device determined by the state determining means, from among the plurality of processing programs, and activating the sequence processing means.

In the above arrangement, the sequence processing means runs a processing program among the plurality of processing programs. The state determining means determines an operation state of the device among the plurality of operation states. The activating means selects the processing program corresponding to the operation state of the device determined by the state determining means, and activates the sequence processing means.

According to the above arrangement, by separating an internal state transition processing from the sequence processing program, the sequence processing program can be easily written without considering the internal state transition processing. Further, this arrangement enables to freely design the internal state transition processing and the sequence processing program without the need of modifying the sequence processing program due to change of the internal state transition processing.

This application is based on Japanese Patent Application No. 2004-49647 filed on Feb. 25, 2004, the contents of which are hereby incorporated by reference.

Although the present invention has been fully written by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A device control apparatus comprising:
   a state determining section which determines an operation state of a device, comprising a video recorder, among a plurality of operation states of the device, the plurality of operation states comprising a playback state, where video is played back, a recording state, where the video recorder performs recording, and a time-shift playback state, where video is played back while the video recorder performs recording;
   a first sequence processing section which runs a processing program among a plurality of processing programs, the plurality of processing programs comprising a playback sequence processing program, which executes a playback sequence processing, and a recording sequence processing program, which executes a recording sequence processing;
   a second sequence processing section which runs a different processing program, other than the processing program run by the first sequence processing section, among the plurality of processing program;
   an activating section which selects the processing program based on the operation state of the device, thereby activating the first sequence processing section, and also selects the different processing program based on the operation state of the device, thereby activating the second sequence processing section while the first sequence processing section is activated; and
   a shared memory region which links the first sequence processing section and the second sequence processing section by sending and receiving data, wherein
   the activating section selects the recording sequence processing program, thereby activating the first sequence processing section which runs the recording sequence processing program, that continuously writes a current time of a program, which is currently recorded, into the shared memory region a recorded time, if the state determining section determines that the video recorder is in the recording state, and also selects the playback sequence processing program while the first sequence processing section is activated, thereby activating the second sequence processing section which runs the playback sequence processing program, that executes a playback processing by referring to the recorded time written in the shared memory region, compares a playback time of a program, which is currently played back, with the recorded time of the program, which is currently recorded, and stops the playback processing in the case where the playback time catches up with the recorded time, if the state determining section determines that the video recorder is in the time-shift playback state.

2. The device control apparatus according to claim 1, wherein the activating section selects an exception processing program for altering the processing program, thereby activating the first sequence processing section which runs the exception processing program, if the state determining section determines that the device has changed its operation state.

3. The device control apparatus according to claim 2, wherein the activating section selects the exception processing program for activating or terminating a task of an operating system, thereby activating the first sequence processing section which runs the exception processing program.

4. A device control method comprising:
   determining an operation state of a device, comprising a video recorder, among a plurality of operation states of the device, the plurality of operation states comprising a playback state where video is played back, a recording state where the video recorder performs recording, and a time-shift playback state where video is played back while the video recorder performs recording;
   selecting a processing program based on the determined operation state of the device from among a plurality of processing programs, the plurality of processing programs comprising a playback sequence processing program, which executes a playback sequence processing, and a recording sequence processing program, which executes a recording sequence processing;
   activating a first sequence processing section, thereby running the selected processing program;
   selecting a different processing program other than the selected processing program; and
   activating a second sequence processing section, thereby running the selected different processing program while the first sequence processing section is activated, wherein
   the recording sequence processing program is selected as the processing program, thereby activating the first sequence processing section which runs the recording sequence processing program, that continuously writes a current time of a program, which is currently recorded, into a shared memory region for linking the first sequence processing section and the second sequence processing section by sending and receiving data as a recorded time, if it is determined that the video recorder is in the recording state, and
   the playback sequence processing program is selected as the different processing program, thereby activating the second processing section which runs the playback sequence processing program, that executes a playback processing by referring to the recorded time continuously written in the shared memory region while the first sequence processing section is activated, compares a playback time of a program, which is currently played back, with the recorded time of the program, which is currently recorded, and stops the playback processing in the case where the playback time catches up with the recorded time, if it is determined that the video recorder is in the time-shift play-back state.

5. The device control method according to claim 4, wherein an exception processing program for altering the processing program is selected as the processing program, thereby activating the first sequence processing section which runs the exception processing program, if it is determined that the device has changed its operation state.

6. The device control method according to claim 5, wherein the exception processing program for activating or terminating a task of an operating system is selected as the processing program, thereby activating the first sequence processing section which runs the exception processing program.

7. A computer-readable recording medium on which a program is recorded, causing a computer to implement a device control method, the device control method comprising:
  determining an operation state of a device, comprising a video recorder, among a plurality of operation states of the device, the plurality of operation states comprising a playback state where video is played back, a recording state where the video recorder performs recording, and a time-shift playback state where video is played back while the video recorder performs recording;
  selecting a processing program based on the determined operation state of the device from among a plurality of processing programs, the plurality of processing programs comprising a playback sequence processing program, which executes a playback sequence processing, and a recording sequence processing program, which executes a recording sequence processing;
  activating a first sequence processing section, thereby running the selected processing program;
  selecting a different processing program other than the selected processing program; and
  activating a second sequence processing section, thereby running the selected different processing program while the first sequence processing section is activated, wherein
  the recording sequence processing program is selected as the processing program, thereby activating the first sequence processing section which runs the recording sequence processing program, that continuously writes a current time of a program, which is currently recorded, into a shared memory region for linking the first sequence processing section and the second sequence processing section by sending and receiving data as a recorded time, if it is determined that the video recorder is in the recording state, and
  the playback sequence processing program is selected as the different processing program, thereby activating the second processing section which runs the playback sequence processing program, that executes a playback processing by referring to the recorded time continuously written in the shared memory region while the first sequence processing section is activated, compares a playback time of a program, which is currently played back, with the recorded time of the program, which is currently played back, with the recorded time of the program, which is currently recorded, and stops the playback processing in the case where the playback time catches up with the recorded time, if it is determined that the video recorder is in the time-shift play-back state.

* * * * *